(12) United States Patent
Shimamoto et al.

(10) Patent No.: US 11,420,619 B2
(45) Date of Patent: Aug. 23, 2022

(54) ACCOMMODATION AREA MANAGEMENT DEVICE

(71) Applicant: HONDA MOTOR CO., LTD., Tokyo (JP)

(72) Inventors: Gaku Shimamoto, Saitama (JP); Junpei Noguchi, Saitama (JP); Yuta Takada, Tokyo (JP); Ryoma Taguchi, Tokyo (JP); Shogo Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/205,635

(22) Filed: Mar. 18, 2021

(65) Prior Publication Data

US 2021/0291813 A1    Sep. 23, 2021

(30) Foreign Application Priority Data

Mar. 19, 2020    (JP) .............................. JP2020-050292

(51) Int. Cl.
*B60W 30/06*    (2006.01)
*G06Q 10/02*    (2012.01)
*G06Q 30/02*    (2012.01)
*G06Q 50/30*    (2012.01)

(52) U.S. Cl.
CPC ............ *B60W 30/06* (2013.01); *G06Q 10/02* (2013.01); *G06Q 30/0207* (2013.01); *G06Q 50/30* (2013.01)

(58) Field of Classification Search
CPC .... G06Q 50/30; G06Q 30/0207; G06Q 10/02; B60W 30/06
See application file for complete search history.

(56) References Cited

U.S. PATENT DOCUMENTS

| | | | | |
|---|---|---|---|---|
| 9,944,282 | B1* | 4/2018 | Fields | B60W 10/04 |
| 2012/0188100 | A1* | 7/2012 | Min | G08G 1/146 |
| | | | | 340/932.2 |
| 2016/0155331 | A1* | 6/2016 | Mielenz | G08G 1/14 |
| | | | | 340/932.2 |
| 2017/0192428 | A1* | 7/2017 | Vogt | G05D 1/0257 |
| 2018/0012156 | A1* | 1/2018 | Voelz | G05D 1/0217 |
| 2018/0244267 | A1* | 8/2018 | Iske | B62D 15/0285 |
| 2020/0394913 | A1* | 12/2020 | Reaser | G01C 21/3617 |

FOREIGN PATENT DOCUMENTS

JP    2012-215923 A    11/2012

* cited by examiner

*Primary Examiner* — Thomas D Alunkal
(74) *Attorney, Agent, or Firm* — Paratus Law Group, PLLC (57) ABSTRACT

A parking lot management device which manages a parking lot for accommodating a vehicle and stops the vehicle at a predetermined parking space in the parking lot includes an acquisition unit which acquires position information of the vehicle in the parking lot, a determination unit which determines whether it is necessary to change a target parking space in which the vehicle should be stopped to a second parking space different from a first parking space in the parking lot when the vehicle is stopped in the first parking space in the parking lot based on the position information acquired by the acquisition unit, and a processing unit which performs a process of changing the target parking space subject to permission of a user of the vehicle when the determination unit determines that it is necessary to change the target parking space.

7 Claims, 5 Drawing Sheets

| PARKING SPACE ID | STATUS | VEHICLE ID | ENTRY TIME | SCHEDULED EXIT TIME |
|---|---|---|---|---|
| 001 | EMPTY | — | — | — |
| 002 | FULL | KH003A | 2018/12/1 14:30 | 2018/12/1 17:00 |
| 003 | EMPTY | — | — | — |
| ⋮ | ⋮ | ⋮ | ⋮ | ⋮ |

FIG.5

| VEHICLE ID | DESIGNATED CONDITION | | | PROVIDED SERVICE INFORMATION |
|---|---|---|---|---|
| | TRAVELING DISTANCE | NUMBER OF TIMES OF REPARKING | NUMBER OF TIMES OF TURNING | |
| SD003A | 500m | 10TIMES | 5TIMES | DISCOUNT OF PARKING FEE |
| ⋮ | ⋮ | ⋮ | ⋮ | ⋮ |

FIG.6

ACCOMMODATION AREA MANAGEMENT DEVICE

CROSS-REFERENCE TO RELATED APPLICATIONS

The present application claims the benefit of priority of Japanese Patent Application No. 2020-050292, filed on Mar. 19, 2020, the content of which is incorporated herein by reference.

TECHNICAL FIELD

The present invention relates to an accommodation area management device which manages an accommodation area for accommodating a moving body.

BACKGROUND

In recent year, a technique related to reservation management of a parking lot is disclosed in which when a user requests a reservation, it is determined whether the reservation can be accepted, and when it is determined that the reservation cannot be accepted, another user is urged to make a vehicle exit from a parking lot, and further when it is approved to make the vehicle exit, the reservation is executed (see, for example, JP-A-2012-215923).

SUMMARY

However, in the technique or the related art, a technique for moving a moving body such as a vehicle within a predetermined accommodation area such as a parking lot is not sufficiently studied. In particular, a technique for appropriately moving a moving body stopped in the accommodation area to effectively utilize a space of an accommodation area is not sufficiently studied.

The present embodiment provides an accommodation area management device which can effectively utilize a space of an accommodation area without causing distrust or discomfort of a user.

An aspect of the present embodiment is an accommodation area management device configured to manage an accommodation area for accommodating a moving body and stops the moving body at a predetermined accommodation position in the accommodation area, comprising:

an acquisition unit configured to acquire position information of the moving body in the accommodation area:

a determination unit configured to determine whether it is necessary to change a target accommodation position in which the moving body should be stopped to a second accommodation position different from a first accommodation position in the accommodation area when the moving body is stopped in the first accommodation position in the accommodation area based on the position information acquired by the acquisition unit; and a processing unit configured to perform a process of changing the target accommodation position subject to permission of a user of the moving body when the determination unit determines that it is necessary to change the target accommodation position.

According to the present embodiment, the target accommodation position of the moving body can be changed with the permission of the user, and thus the accommodation area can be effectively utilized without causing distrust or discomfort of the user.

DESCRIPTION OF EMBODIMENT

Hereinafter, an embodiment of an accommodation area management device of the present embodiment will be described with reference to the accompanying drawings. In the following embodiment, an example will be described in which a moving body in the present embodiment is a vehicle and an accommodation area in the present embodiment is a parking lot. Further, in the following embodiment, an example in which the accommodation area management device of the present embodiment is used as a parking lot management device for managing a parking lot will be described.

Vehicle System

Figure 1:
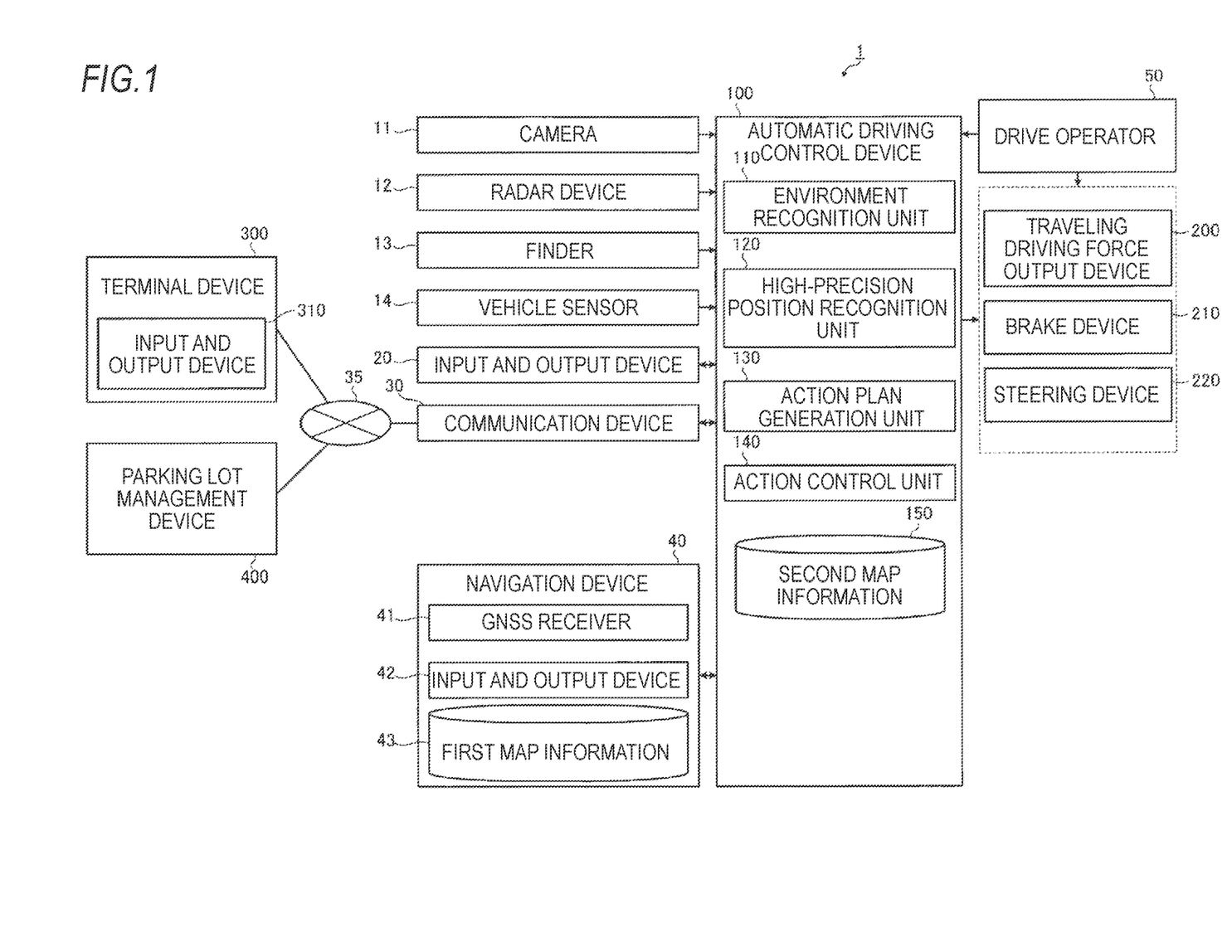
FIG. 1 is a diagram illustrating an example of a configuration of a vehicle system of an embodiment.

First, a vehicle of the embodiment will be described. In FIG. 1, a vehicle system 1 is mounted on a vehicle having an automatic driving function of a so-called automatic driving level "4" or higher A vehicle (hereinafter, also referred to as vehicle M) equipped with the vehicle system 1 is a vehicle including a drive source (for example, traveling driving force output device 200 described below) and wheels (for example, two wheels, three wheels, or four wheels) including driving wheels driven by the power of the drive source. The drive source of the vehicle M is, for example, an electric motor. Further, the drive source of the vehicle M may be an internal combustion engine such as a gasoline engine or a combination of an electric motor and an internal combustion engine.

As illustrated in FIG. 1, the vehicle system 1 includes a camera 11, a radar device 12, a finder 13, a vehicle sensor 14, an input and output device 20, a communication device 30, a navigation device 40, a drive operator 50, an automatic driving control device 100, the traveling driving force output device 200, a brake device 210, and a steering device 220. Each of those devices is communicably connected to each other by a wired or wireless communication network. The communication network connecting each of those devices is, for example, Controller Area Network (CAN).

The camera 11 is a digital camera which photographs the periphery (for example, in front of vehicle M) of the vehicle M and outputs image data obtained by the photographing to the automatic driving control device 100. The radar device 12 is, for example, a radar device using radio waves in a millimeter wave band, detects a position of an object in the vicinity (for example, in front of, behind, and to the side of vehicle M) of the vehicle M, and outputs the detection result to the automatic driving control device 100.

The finder 13 is, for example, Laser Imaging Detection and Ranging (LIDAR). The finder 13 uses a predetermined laser beam to measure the distance to an object (target object) around (for example, in front of, behind, and to the side of vehicle M) the vehicle M and outputs the measurement result to the automatic driving control device 100.

The vehicle sensor 14 includes, for example, a vehicle speed sensor which detects the speed of the vehicle M, an acceleration sensor which detects the acceleration of the vehicle M, an angular velocity sensor which detects the angular velocity around a vertical axis of the vehicle M, an orientation sensor which detects the orientation of the vehicle M, and the like. Further, the vehicle sensor 14 includes a radio wave intensity sensor which detects the radio wave intensity (that is, the communication intensity) of the radio wave used by the communication device 30, described later, for communication. The vehicle sensor 14 outputs the detection result of each sensor to the automatic driving control device 100 or the like.

The input and output device 20 includes an output device which outputs various kinds of information to a user of the vehicle M and an input device which accepts various input operations from the user of the vehicle M. The output device of the input and output device 20 is, for example, a display which displays based on a processing result of the automatic driving control device 100. The output device may be a speaker, a buzzer, an indicator light, or the like. The input device of the input and output device 20 is, for example, a touch panel or an operation button (key, switch, or the like) which outputs an operation signal corresponding to an input operation received from a user to the automatic driving control device 100.

The communication device 30 is connected to a network 35 and communicates with another device provided outside the vehicle system 1 via the network 35. The network 35 includes, for example, a mobile communication network, a Wi-Fi network, Bluetooth (registered trademark), Dedicated Short Range Communication (DSRC), and the like.

The communication device 30 communicates with, for example, a terminal device 300 carried by a user of the vehicle M, a parking lot management device 400 which manages a parking lot PA where the vehicle M can be parked. The terminal device 300 is, for example, a smartphone or a tablet terminal and is an electronic device connected to the network 35 and including an input and output device 310. The input and output device 310 is, for example, a display which displays various information to a user, a touch panel which accepts a user's input operation, and the like. The parking lot PA and the parking lot management device 400 will be described below.

The navigation device 40 includes a Global Navigation Satellite System (GNSS) receiver 41 and an input and output device 42. Further, the navigation device 40 includes a storage device (not illustrated) such as a flash memory and first map information 43 is stored in this storage device. The first map information 43 is, for example, information representing a road shape by a link indicating a road and a node connected by the link. Further, the first map information 43 may include information representing the curvature of the road and the Point Of Interest (POI).

The GNSS receiver 41 identifies the latitude and longitude of a point where the vehicle M is located as the position of the vehicle M based on the signal received from the GNSS satellite. Further, the navigation device 40 may specify or correct the position of the vehicle M by an Inertial Navigation System (INS) using the output of the vehicle sensor 14.

The input and output device 42 includes an output device which outputs various kinds of information to a user of the vehicle M and an input device which accepts various input operations from a user of the vehicle M. The output device of the input and output device 42 is, for example, a display which displays (for example, displays a route on a map described below) based on the processing result of the navigation device 40. Further, the input device of the input and output device 42 is, for example, a touch panel or an operation button (key, switch, or the like) which outputs an operation signal corresponding to the input operation received from a user to the navigation device 40. The input and output device 42 may be shared with the input and output device 20.

For example, the navigation device 40 determines a route (hereinafter, also referred to as a route on the map) from the position of the vehicle M specified by the GNSS receiver 41 to a destination input by the user with reference to the first map information 43. Then, the navigation device 40 guides the determined route on the map to the user by the input and output device 42. Further, the navigation device 40 outputs information indicating the position of the vehicle M specified by the GNSS receiver 41 and information indicating the determined route on the map to the automatic driving control device 100.

The navigation device 40 may be realized by the function of the terminal device 300. Also, for example, the communication device 30 may transmit information indicating the position of the vehicle M and the destination input by a user to a server device (navigation server) outside the vehicle system 1 and the function of the navigation device 40 may be realized by this server device.

The drive operator 50 is various operators such as an accelerator pedal, a brake pedal, a shift lever, a steering wheel, a deformed steering wheel, and a joystick. The drive operator 50 is provided with a sensor which detects the amount of operation or the presence or absence of operation on the drive operator 50. The detection result by the sensor of the drive operator 50 is output to a part or all of the automatic driving control device 100, the traveling driving force output device 200, the brake device 210, and the steering device 220.

The traveling driving force output device 200 outputs a traveling driving force (torque) for the vehicle M to travel to the driving wheels. The traveling driving force output device 200 includes, for example, an electric motor and an electric motor Electronic Control Unit (ECU) which controls the electric motor. The electric motor ECU controls the electric motor based on the detection result by the sensor of the drive operator 50 (for example, the accelerator pedal) and the control information from the automatic driving control device 100. Further, when the vehicle M includes an internal combustion engine or a transmission as a drive source, the traveling driving force output device 200 may include an internal combustion engine or a transmission and an ECU for controlling the combustion engine or the transmission.

The brake device 210 includes, for example, a brake caliper, a cylinder which transmits hydraulic pressure to the brake caliper, an electric motor which generates hydraulic pressure in the cylinder, and a brake ECU. Based on the detection result by the sensor of the drive operator 50 (for example, the brake pedal) and the control information from the automatic driving control device 100, the brake ECU controls the electric motor of the brake device 210 so that the brake torque corresponding to the braking operation is output to each wheel.

The steering device 220 includes, for example, a steering ECU and an electric motor. The electric motor of the steering device 220, for example, applies a force to the rack and pinion mechanism to change the direction of the steering wheel. Based on the detection result by the sensor of the drive operator 50 (for example, the steering wheel) and the control information from the automatic driving control device 100, the steering ECU drives the electric motor of the steering device 220 to change the direction of the steering wheels.

Automatic Driving Control Device

The automatic driving control device 100 includes an environment recognition unit 110, a high-precision position recognition unit 120, an action plan generation unit 130, and an action control unit 140. Further, the automatic driving control device 100 includes a storage device (not illustrated) realized by a flash memory or the like to which each functional unit (for example, high-precision position recognition unit 120) of the automatic driving control device 100 can access and a second map information 150 is stored in this storage device.

The second map information 150 is more accurate map information than the first map information 43. The second map information 150 includes, for example, information indicating the center of a lane, information indicating a lane boundary line (for example, a road lane marking), and the like. Further, the second map information 150 may include road information, traffic regulation information, address information, facility information, telephone number information, and the like.

Further, the second map information 150 may be updated at any time by the communication device 30 communicating with another device. For example, when the vehicle M enters the parking lot PA, the communication device 30 receives information (hereafter, also referred to as in-parking-lot map information) indicating the lane in the parking lot PA, the position of each parking space, and the like from the parking lot management device 400. Then, the automatic driving control device 100 updates the second map information 150 so as to incorporate the received in-parking-lot map information into the second map information 150. As a result, the automatic driving control device 100 can specify the position of each parking space in the parking lot PA with reference to the second map information 150.

The environment recognition unit 110 performs sensor fusion processing on information acquired by a part or all of the camera 11, the radar device 12, and the finder 13, in such a manner that the environment recognition unit 110 recognizes an object around the vehicle M and recognizes its position. The environment recognition unit 110 recognizes, for example, an obstacle, a road shape, a traffic light, a guardrail, a utility pole, a surrounding vehicle (including traveling conditions such as speed and acceleration and parking conditions), a lane mark, a pedestrian, and the like and recognizes their positions.

Referring to the position of the vehicle M specified by the navigation device 40, the detection result by the vehicle sensor 14, the image taken by the camera 11, the second map information, and the like, the high-precision position recognition unit 120 recognizes the detailed position and attitude of the vehicle M. The high-precision position recognition unit 120 recognizes, for example, the traveling lane in which the vehicle M is traveling or recognizes the relative position and attitude of the own vehicle with respect to the traveling lane. Further, the high-precision position recognition unit 120 also recognizes, for example, the position of the vehicle M in the parking lot PA.

The action plan generation unit 130 generates an action plan for the vehicle M. Specifically, the action plan generation unit 130 generates a target track on which the vehicle M will travel in the future as an action plan of the vehicle M. The target track is, for example, information in which points (track points) to be reached by the vehicle M are arranged for each predetermined traveling distance (for example, about several [m]). Further, the target track may include information on speed elements such as the target speed and the target acceleration of the vehicle M at each predetermined time or at each track point. The action plan generation unit 130 generates an action plan according to the instructions of the parking lot management device 400 received by the communication device 30, for example.

The action control unit 140 controls the vehicle M to act according to the action plan generated by the action plan generation unit 130. Specifically, the action control unit 140 controls the traveling driving force output device 200, the brake device 210, and the steering device 220 so that the vehicle M passes the target track generated by the action plan generation unit 130 at the scheduled time. The action control unit 140 controls, for example, the traveling driving force output device 200 and the brake device 210 based on the speed element associated with the target track and controls the steering device 220 according to a curvature degree of the target track.

Each functional unit included in the automatic driving control device 100 is realized, for example, by the Central Processing Unit (CPU) executing a predetermined program (software). Further, a part or all of the functional units of the automatic driving control device 100 may be realized by hardware such as Large Scale Integration (LSI), Application Specific Integrated Circuit (ASIC), Field-Programmable Gate Array (FPGA), Graphics Processing Unit (GPU), and for example, the storage device for storing the second map information 150 and the high-precision position recognition unit 120 may be realized by a Map Positioning Unit (MPU). Further, a part or all of the functional units of the automatic driving control device 100 may be realized by the cooperation of software and hardware.

Parking Lot Managed by Parking Lot Management Device

Figure 2:
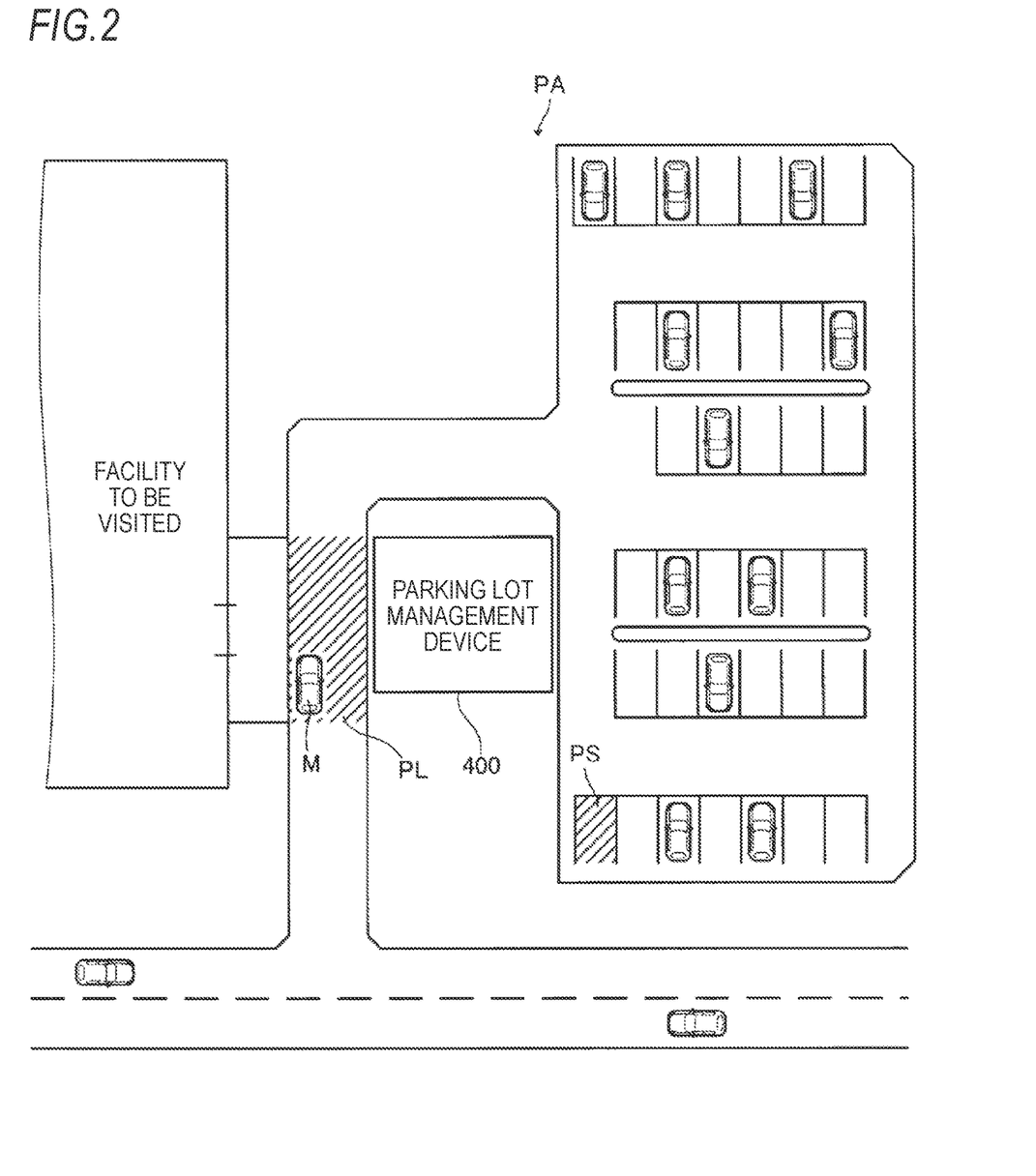
FIG. 2 is a diagram illustrating an example of a parking lot managed by a parking lot management device.

Next, an example of the parking lot PA will be described with reference to FIG. 2. As illustrated in FIG. 2, the parking lot PA is a parking lot managed by the parking lot management device 400 and is an automatic valet parking type parking lot attached to a visited facility to be visited by a user. The parking lot PA includes a plurality of parking spaces PS where a vehicle (for example, vehicle M) can be accommodated and a platform PL provided right before the plurality of parking spaces PS. Hereinafter, an example in which a user of the vehicle M uses the parking lot PA will be described.

Before using the parking lot PA, the user of the vehicle M uses the terminal device 300 to make a reservation (hereinafter, also referred to as a parking reservation) for using the parking lot PA to the parking lot management device 400 which manages the parking lot PA. For example, the user of the vehicle M inputs the date and time when the parking lot PA is used and the identification information of the vehicle M into the terminal device 300 and sends the information to the parking lot management device 400, so that the reservation for using the parking lot PA is made. Then, when it comes to the date and time of the usage reservation, the user of the vehicle M rides the vehicle M on the platform PL and gets off from the vehicle M on the platform PL.

After the user gets off the vehicle M, the vehicle M automatically drives and starts a self-propelled parking event to move to the parking space PS in the parking lot PA. For example, the user uses the terminal device 300 to send a request to start the self-propelled parking event to move to the parking space PS to the parking lot management device 400. In response to this start request, the parking lot management device 400 instructs vehicle M to perform the self-propelled parking event for parking the vehicle M in a predetermined parking space PS. According to this instruction, the vehicle M moves to the parking space PS instructed by the parking lot management device 400 while being guided by the parking lot management device 400 or sensing with the camera 11, the radar device 12, the finder 13, or the like.

In addition, the vehicle M can carry out re-parking, so-called "reparking", in which the parking position is changed to another parking position while the vehicle M is parked in the parking lot PA. This reparking is appropriately carried out by an instruction from the parking lot management device 400 or by voluntary automatic driving by the vehicle M itself.

In addition, at the time of exiting from the parking lot PA, the vehicle M performs automatic driving and performs a self-propelled parking event to move from the parking space PS to the platform PL. For example, the user uses the terminal device 300 to send a request to start the self-propelled parking event for moving the vehicle M to the platform PL to the parking lot management device 400. In response to this start request, the parking lot management device 400 instructs the vehicle M to perform the self-propelled parking event for moving the vehicle M from the parking space PS where the vehicle M is parked to the platform PL. According to this instruction, the vehicle M moves to the platform PL while being guided by the parking lot management device 400 or sensing with the camera 11, the radar device 12, the finder 13, or the like. The user of the vehicle M gets on the vehicle M at the platform PL and exits from the parking lot PA.

Parking Lot Management Device

Figure 3:
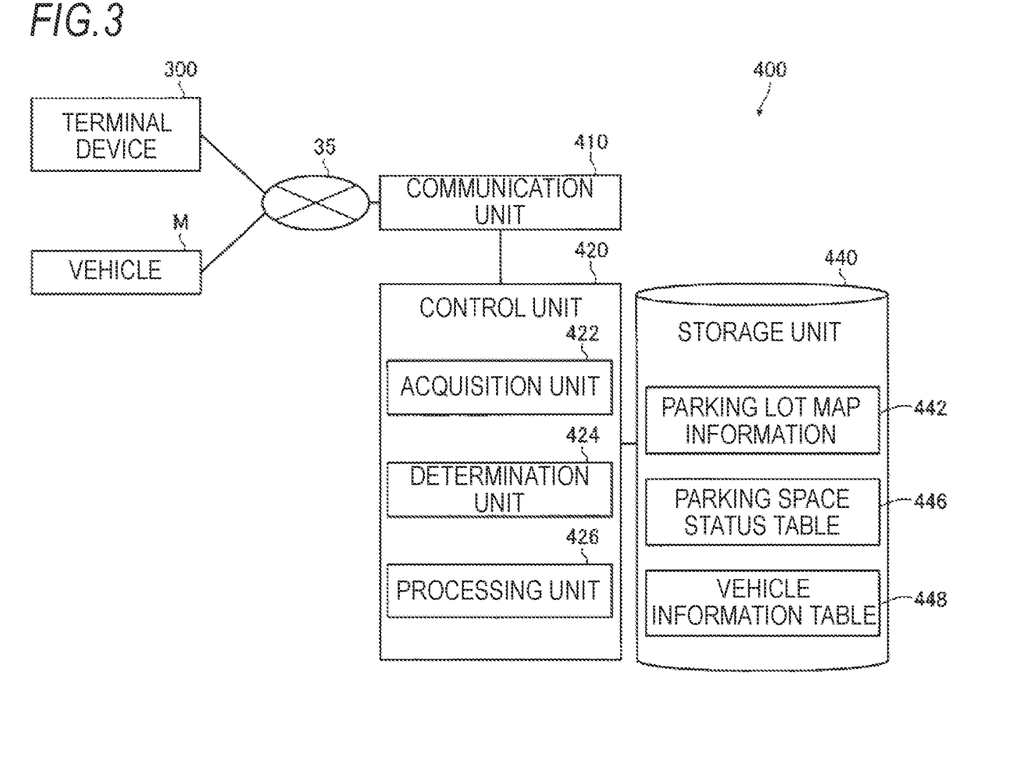
FIG. 3 is a diagram illustrating an example of a configuration of the parking lot management device.

Next, an example of the configuration of the parking lot management device 400 will be described with reference to FIG. 3. As illustrated in FIG. 3, the parking lot management device 400 includes, for example, a communication unit 410, a control unit 420, and a storage unit 440. The control unit 420 includes, for example, an acquisition unit 422, a determination unit 424, and a processing unit 426. Each component of the control unit 420 is realized, for example, by a hardware processor such as a CPU executing a program (software). Some or all of those components may be realized by hardware (circuit part: including circuitry) such as LSI, ASIC, FPGA, and GPU or may be realized by collaboration between software and hardware. The program may be stored in advance in a storage device (a storage device including a non-transient storage medium) such as an HDD or a flash memory, or the program may be stored in a removable storage medium (a non-transient storage medium) such as a DVD or a CD-ROM and installed by attaching the storage medium to a drive device.

Information such as parking lot map information 442, a parking space status table 446, and a vehicle information table 448 is stored in the storage unit 440. The storage unit 440 is realized by an HDD, a flash memory, or the like.

The communication unit 410 wirelessly (for example, network 35) communicates with the vehicle M or the user's terminal device 300. The control unit 420 guides the vehicle M to the parking space PS based on the information acquired by the communication unit 410 and the information stored in the storage unit 440. The parking lot map information 442 is information which geometrically represents the structure of the parking lot PA. Further, the parking lot map information 442 includes the coordinates for each parking space PS.

Figure 4:
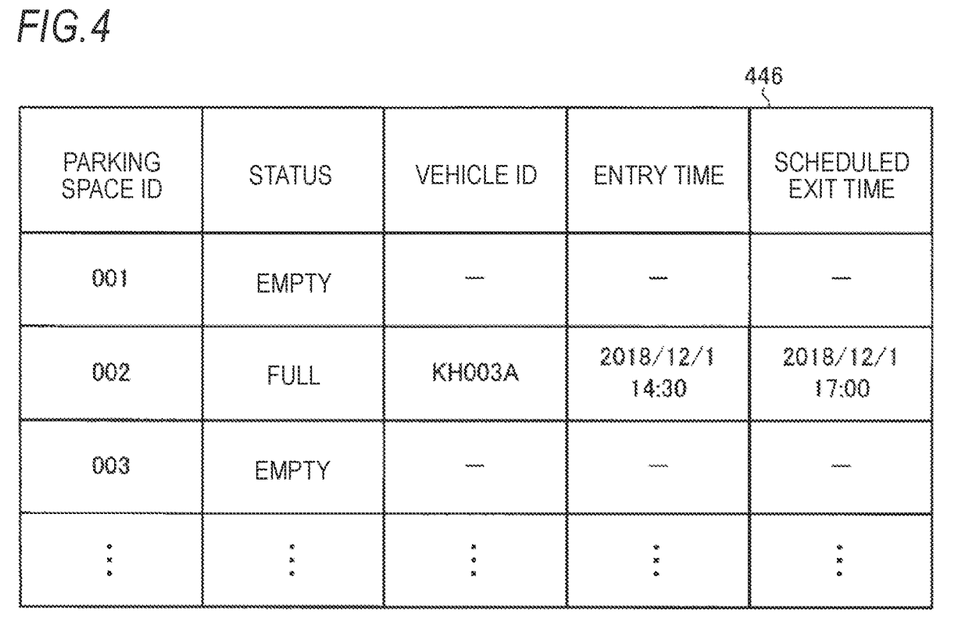
FIG. 4 is a diagram illustrating an example of a parking space status table.

The acquisition unit 422 acquires the position information of the vehicle M already parked in the parking lot PA via the communication unit 410. This position information is stored, for example, in the form of the parking space status table 446. As illustrated in FIG. 4, in the parking space status table 446, for example, information indicating whether the parking space PS is empty or full (parked), the vehicle ID which is the identification information of the parked vehicle M when the parking space PS is full, and the entry time and scheduled exit time of the vehicle M when the parking space PS is full are associated with the parking space ID which is the identification information of the parking space PS. The entry time and the scheduled exit time are recorded, for example, in association with the vehicle ID of the vehicle M when the vehicle M enters the parking lot PA. The vehicle ID can be, for example, a vehicle number written on a vehicle number plate (so-called license plate).

In addition, the acquisition unit 422 also acquires the position information of the vehicle M traveling in the parking lot PA. The vehicle M traveling in the parking lot PA periodically transmits information associating the vehicle ID of the own vehicle with the position (for example, the position recognized by high-precision position recognition unit 120) of the own vehicle in the parking lot PA to the parking lot management device 400. The acquisition unit 422 acquires information in which the vehicle ID transmitted from the vehicle M traveling in the parking lot PA and the position in the parking lot PA are associated with each other via the communication unit 410, Further, when the parking lot management device 400 receives the information in which the vehicle ID and the position in the parking lot PA are associated with each other from the vehicle M traveling in the parking lot PA, the parking lot management device 400 may store the received information in a predetermined table of the storage unit 440. Then, the acquisition unit 422 may acquire the position information of the vehicle M traveling in the parking lot PA with reference to this table.

Based on the position information of the vehicle M acquired by the acquisition unit 422, the determination unit 424 determines whether it is necessary to change a target parking position where the vehicle M should be parked to a second parking position (second parking space PS) in the parking lot PA, which is different from a first parking position (first parking space PS) where the vehicle M is parked. For example, when the vehicle M is parked in the first parking space PS, a parking reservation may be made to park a special size or type of vehicle (hereinafter, simply a special vehicle) in the parking lot PA, or a special vehicle may actually enter the parking lot PA. Then, there is a case where such a special vehicle can be parked only in the first parking space PS where the vehicle M is parked and there is a case where it is most suitable to park the special vehicle in the first parking space PS. In such a case, it is appropriate to park the special vehicle in the first parking space PS, but the vehicle M is already parked in the first parking space PS. That is, the special vehicle cannot be accommodated (or is not preferred to be accommodated) in a parking space PS which is empty in the parking space status table 446, while it can be accommodated (or is preferred to be accommodated) in a parking space PS which is full in the parking space status table 446.

Leaving such a state unattended is not preferable from a viewpoint of effective utilization of the parking lot PA. Therefore, when such a situation occurs, specifically, when another vehicle trying to enter the parking lot PA should be parked in the first parking space PS, the determination unit 424 determines that it is necessary to move the vehicle M parked in the first parking space PS which is full to the second parking space PS which is empty. That is, when the vehicle M is currently parked in the first parking position (first parking space PS), the determination unit 424 can determine whether it is necessary to change the target parking position where the vehicle M should be parked to the second accommodation position (second parking space PS) different from the first parking position.

Even when the above situation occurs and the determination unit 424 determines that the target parking position needs to be changed, it is not preferable to change the target parking position without permission of the user of the vehicle M and move the vehicle M from the first parking space PS to the second parking space PS. Therefore, the processing unit 426 respects the intention of the user and performs a process of changing the target parking position subject to the permission of the user.

As described above, from the viewpoint of effective utilization of the parking lot PA, the parking lot management device 400 of the embodiment can carry out re-parking, so-called "reparking", in which the parking position of the vehicle M which is already parked is changed to another parking position in the parking lot PA. However, the parking lot management device 400 is subject to the permission of the user of the target vehicle M in carrying out the reparking. Since the reparking is carried out with the permission of the user in advance, the parking lot PA can be used more effectively without causing distrust or discomfort of the user.

The processing unit 426 sets the new second parking position (in the above example, second parking space PS in an empty state) as the target parking position of the vehicle M instead of the first parking position (in the above example, first parking space PS in a full state). The processing unit 426 acquires the position of the second parking space PS from the parking lot map information 442 while referring to the parking space status table 446, and then the processing unit 426 transmits a suitable route to the position of the acquired second parking space PS to the vehicle M by using the communication unit 410.

In the vehicle M which receives the route, the action plan generation unit 130 generates a target track based on the route. The action control unit 140 controls the vehicle M to act according to the action plan generated by the action plan generation unit 130 and parks the vehicle M in the parking space PS.

Here, the processing unit 426 may set a target parking position which satisfies a predetermined designated condition specified in advance by a user. As a result, the satisfaction level of a user can be further improved. Examples of the designated condition include a traveling distance of the vehicle M, the number of times the target parking position is changed, the number of times of turning, and the like. Here, the traveling distance is the traveling distance (in the above example, the traveling distance from first parking space PS to second parking space PS) in the parking lot PA. The number of times the target parking position is changed is the number of times of re-parking, that is, the number of times of reparking. The number of times of turning is the number of turns of a steering wheel required for the movement.

Figure 5:
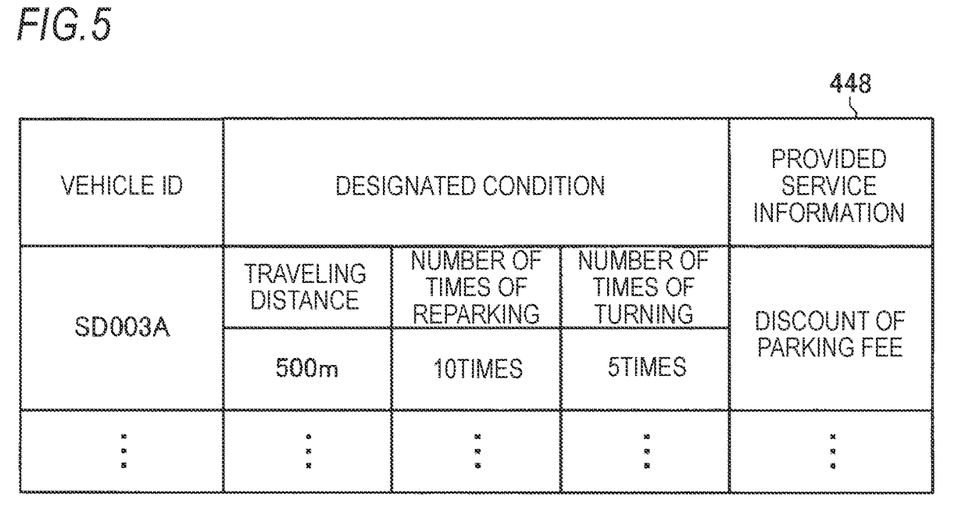
FIG. 5 is a diagram illustrating an example of a vehicle information table.

The above-described designation conditions are stored in the format of, for example, the vehicle information table 448. As illustrated in FIG. 5, the vehicle information table 448 stores, for example, the vehicle ID which is the identification information of the vehicle M, the user ID which is the identification information of the user, and the designated condition in association with each other. For example, when using the parking lot PA (for example, when requesting the start of a self-propelled parking event), the user transmits the vehicle ID of the vehicle M to be parked in the parking lot PA, a user ID of the user, and the designated condition information indicating the specified designated condition to the parking lot management device 400 by using the terminal device 300.

When the parking lot management device 400 receives the designated condition information by the communication unit 410, the parking lot management device 400 stores the received designated condition information in the vehicle information table 448 of the storage unit 440. When the processing unit 426 receives the permission for reparking from the user, the processing unit 426 refers to the vehicle information table 448 and sets the target parking position satisfying the designated condition specified by the user. A user who does not want to change (repack) the target parking position of his or her own vehicle M may, for example, specify the number of times the target parking position is changed to "0 times".

Further, when there is no target parking position satisfying the designated condition specified by a user of the initially targeted vehicle M, the processing unit 426 may propose to another user to change the target parking position. When the currently available parking space does not satisfy the designated condition specified by the initial user, but satisfies the designated condition specified by another user, reparking can be proposed to the other user, and thus the space of the parking lot PA can be further effectively utilized.

As described above, the communication unit 410 wirelessly communicates with the vehicle M or the user's terminal device 300. The communication unit 410 can transmit the determination of the change of the target parking position by the determination unit 424 to the terminal device 300. In this case, the processing unit 426 can change the target parking position when the communication unit 410 receives the user permission information from the terminal device 300. That is, when the determination unit 424 determines that the target parking position needs to be changed, the communication unit 410 sends a request to the terminal device 300 to obtain permission to change the target parking position, and then the processing unit 426 can change the target parking position when it receives the permission information for the request from the terminal device 300. As a result, the permission of the user can be surely obtained.

Even with permission, the vehicle M may not be able to be parked at the target parking position. In the example described above, there is a case where an obstacle (hereinafter, also referred to as a parking obstacle) obstructing parking is arranged in the empty second parking space PS. In such a case, the vehicle M transmits, for example, no-parking available information indicating that parking is not possible to the parking lot management device 400 after moving from the first parking position. The environment recognition unit 110 of the vehicle M performs sensor fusion processing on the information acquired by some or all of the camera 11, the radar device 12, and the finder 13, in such a manner that the environment recognition unit 110 recognizes the objects around the vehicle M and recognizes the positions of the objects. Therefore, the environment recognition unit 110 can recognize that a parking obstacle such as a road cone is arranged in the second parking space PS. The communication unit 410 of the parking lot management device 400 may receive the no-parking available information and then transmit the no-parking available information to the user's terminal device 300. The user can know in advance that his or her vehicle M will not move to the second parking space PS, which will increase the convenience of the user.

Also, when the vehicle M cannot be parked at the target parking position even with permission, that is, when the parking lot management device 400 receives no-parking available information from the vehicle M, the processing unit 426 may set the target parking position to a third parking position (third parking space PS) located between the current position of the vehicle M and the exit of the parking lot PA, which is different from the first parking position or the second parking position. As a result, it is possible to further effectively utilize the parking lot PA without significantly reducing the convenience for the user.

The parking lot management device 400 can provide services such as discounting the usage fee of the parking lot and maintenance that the user's vehicle can receive in the parking lot PA to a user who allows change of the target parking position. More specifically, as illustrated in FIG. 5, the vehicle information table 448 is configured to store provided service information indicating a service to be provided in association with the vehicle ID.

When a user permits the change of the target parking position of the vehicle M, the parking lot management device 400 stores, in the vehicle information table 448, information indicating, for example, "discount of the parking fee (that is, the usage fee of parking lot PA)" as the provided service information corresponding to the vehicle M of the user. Then, when the vehicle M exits from the parking lot PA, if the information indicating the "discount of the parking fee" is stored in association with the vehicle ID of the vehicle M, the parking lot management device 400 calculates a fee discounted by a predetermined amount as the parking tee of the vehicle M. As a result, it is possible to provide a service of discounting the parking fee to the user who allows the change of the target parking position. Therefore, it is possible to prompt a user for permission to change the target parking position, and thus it is possible to further effectively utilize the parking lot PA.

The parking lot management device 400 is not limited to discounting the parking fee and may provide services such as discounting the next parking fee, maintenance, charging, and refueling. Further, the parking lot management device 400 may allow a user to select, for example, a service to be provided to a user who permits the change of the target parking position, and then the parking lot management device 400 may store the provided service information indicating the service selected by the user to provide the service selected by the user. As a result, a predetermined service can be provided to the user who permits the change of the target parking position, and thus the user can be prompted to permit the change of the target parking position. As a result, the parking lot PA can be further effectively utilized.

Processing Flow

Figure 6:
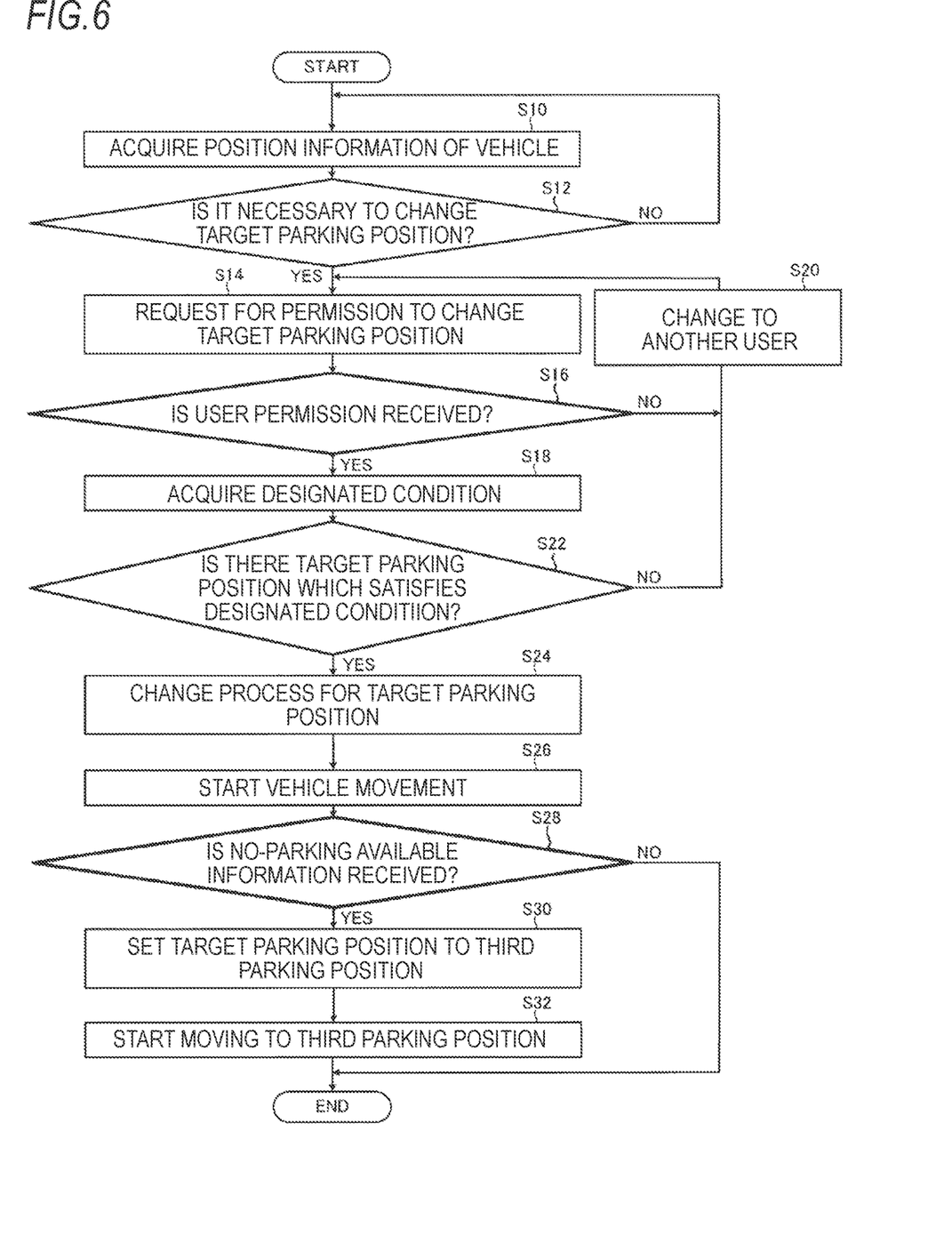
FIG. 6 is a flowchart illustrating a series of processing flows of the parking lot management device.

Hereinafter, a series of processing flows of the parking lot management device 400 will be described with reference to FIG. 6. The processes illustrated in FIG. 6 may be repeated at a predetermined cycle.

First, the acquisition unit 422 acquires the position information of the vehicle M already parked in the parking lot PA via the communication unit 410 (Step S10). This position information is stored, for example, in the format of the parking space status table 446 of FIG. 4.

Based on the position information of the vehicle M acquired by the acquisition unit 422, the determination unit 424 determines whether it is necessary to change the target parking position where the vehicle M should be parked to the second accommodation position in the parking lot PA, which is different from the first parking position where the vehicle M is parked (Step S12). This determination is made, for example, by the presence or absence of registration of special parking reservation information (parking reservation for a special vehicle) as described above.

Next, when the determination unit 424 determines that the target parking position needs to be changed, the processing unit 426 performs a process of changing the target parking position subject to the permission of a user. Specifically, the processing unit 426 sends a request to the user's terminal device 300 via the communication unit 410 to obtain permission to change the target parking position (Step S14). When the permission of the user is received as a reply to the request (Step S16), the processing unit 426 acquires a predetermined designated condition specified in advance by the user (Step S18). This designation condition is stored in advance in a predetermined table of the storage unit 440. However, the designated condition may be received with the permission of the user. When the permission of the user cannot be received as a reply to the request (NO in Step S16), the processing unit 426 switches the proposal for changing the target parking position to another user (Step S20) and performs the processes after Step S14 again, but is not limited to this. For example, the processing unit 426 may re-send the request to the first user while presenting benefits such as fee discount information.

When there is no target parking position which satisfies the designated condition set by the user (NO in Step S22), the processing unit 426 switches the proposal for changing the target parking position to another user (step S20) and performs the processes after Step S14 again. On the other hand, when there is a target parking position satisfying the designated condition set by the user (YES in Step S22), the processing unit 426 executes the target parking position change process (Step S24), and then the processing unit 426 transmits a signal for moving the vehicle M from the first parking position where the vehicle M is currently parked to the second parking position in the parking lot via the communication unit 410. The vehicle M receives this signal via the communication device 30 and starts moving to the second parking position (Step S26).

In addition, this process is also established even in the order in which Step S22 in this example, that is, the confirmation of existence of a user who satisfies the designated condition, is performed first, and then when such a user exists, a request for permission to change the target parking position is sent to that user. That is, the order of Steps S14 to S22 can be changed as appropriate.

The vehicle M moves to the second parking position, and when there is no particular problem, the vehicle M is parked in the second parking position and the process ends (NO in Step S28). On the other hand, when the vehicle M cannot be parked in the second parking position due to the existence of the above-described parking obstacle or the like, the vehicle M transmits the no-parking available information indicating that parking is not possible to the parking lot management device 400 and the communication unit 410 receives the no-parking available information (YES in Step S28). Further, the communication unit 410 transmits the no-parking available information to the user's terminal device 300.

Upon receiving the no-parking available information by the communication unit 410, the processing unit 426 sets the target parking position to the third parking position located between the current position of the vehicle M and the exit of the parking lot PA (Step S30). The vehicle M receives this signal via the communication device 30 and moves to the third parking position (Step S32).

The parking lot management device 400 determines whether it is necessary to change the target parking position of the vehicle M parked in the parking lot PA, that is, whether it is necessary to repark according to various reasons. When performing reparking, the parking lot management device 400 is subject to obtaining permission for reparking from the user of the target vehicle M. That is, since the reparking is appropriately carried out with the permission of the user in advance, the parking lot PA can be used more effectively without causing distrust or discomfort of the user. The reason for the determination unit 424 of the parking lot management device 400 to determine whether it is necessary to change the target parking position is not limited to the size, type, and the like of the vehicle for which the parking reservation is desired.

In the embodiment described above, a so-called vehicle is reparked in a parking lot. However, the idea of the present invention is not limited to such an embodiment and is also applied to a moving body (for example, a robot) including a vehicle. That is, the present invention includes a case where the target accommodation position is changed in the accommodation area for accommodating the so-called moving body. Under this idea, "parking" is extended to the concept of "stop" and the "parking lot management device" of the embodiment is extended to the concept of "accommodation area management device". The repark also includes an operation of "re-stopping to change the accommodation position of the stopped moving body to another accommodation position in the accommodation area".

Although the present embodiment for carrying out the present invention is described above using the embodiment, the present invention is not limited to the present embodiment and various modifications and substitutions can be made without departing from the gist of the present invention.

In addition, at least the following matters are described in this specification. The components and the like corresponding to those of the embodiment described above are shown in parentheses, but the present invention is not limited thereto.

(1) An accommodation area management device (parking lot management device 400) which manages an accommodation area (parking lot PA) for accommodating a moving body (vehicle M) and stops the moving body at a predetermined accommodation position (parking space PS) in the accommodation area, including:

an acquisition unit (acquisition unit 422) which acquires position information of the moving body in the accommodation area;

a determination unit (determination unit 424) which determines whether it is necessary to change a target accommodation position in which the moving body should be stopped to a second accommodation position different from a first accommodation position in the accommodation area when the moving body is stopped in the first accommodation position in the accommodation area based on the position information acquired by the acquisition unit; and a processing unit (processing unit 426) which performs a process of changing the target accommodation position subject to permission of a user of the moving body when the determination unit determines that it is necessary to change the target accommodation position.

According to (1), when it is necessary to change the target accommodation position where the moving body should be stopped, the target accommodation position is changed subject to the permission of the user of the moving body. As a result, the target accommodation position of the moving body can be changed with the permission of the user, and thus the accommodation area can be effectively utilized without causing distrust or discomfort of the user.

(2) The accommodation area management device according to (1), where the processing unit sets the target accommodation position which satisfies a designated condition specified by the user of the moving body when the target accommodation position of the moving body is changed.

According to (2), since the target accommodation position which satisfies the designated condition specified by the user is set, the user can change the target accommodation position which satisfies the desired condition, and thus the satisfaction level of the user can be improved.

(3) The accommodation area management device according to (2), where the designated condition includes at least one of a moving distance of the moving body, the number of times the target accommodation position is changed, and the number of times of turning.

According to (3), the user can change the target accommodation position satisfying a desired condition, and thus the satisfaction level of the user can be improved.

(4) The accommodation area management device according to (2) or (3), where another user is proposed to change a target accommodation position when the target accommodation position which satisfies the designated condition does not exist.

According to (4), even when the accommodation position where the vehicle can stop currently does not satisfy the designated conditions specified by the original user, if it satisfies the designated condition specified by another user, repacking can be proposed to the other user. Therefore, it is possible to further effectively utilize the accommodation area.

(5) The accommodation area management device according to any one of (1) to (4), further including:

a communication unit capable of communicating with a terminal device of the user of the moving body, where the communication unit sends a request to the terminal device to obtain permission for change of the target accommodation position when the determination unit determines that it is necessary to change the target accommodation position, and the processing unit changes the target accommodation position when the communication unit receives permission information for the request from the terminal device.

According to (5), the permission of the user can be surely obtained.

(6) The accommodation area management device according to any one of (1) to (5), where the moving body transmits no-stop available information to the accommodation area management device when the moving body cannot stop at the second accommodation position after moving from the first accommodation position, and the processing unit sets the target accommodation position to a third accommodation position located between a current position of the moving body and an exit of the accommodation area and different from the first accommodation position or the second accommodation position when the accommodation area management device receives the no-stop available information from the moving body.

According to (6), it is possible to further effectively utilize the accommodation area without significantly reducing the convenience for the user.

(7) The accommodation area management device according to any one of (1) to (6), where at least one of a discount on a usage fee of the accommodation area and a service that the moving body can receive in the accommodation area is offered to the user of the moving body who allows the change of the target accommodation position.

According to (7), since it is possible to prompt the user for permission to change the target accommodation position, it is possible to further effectively utilize the accommodation area.

(8) The accommodation area management device according to any one of (1) to (7), where the determination unit further determines whether it is necessary to change the target accommodation position in which the moving body should be stopped based on whether another moving body which newly attempts to enter the accommodation area should be stopped at the first accommodation position.

According to (8), the target accommodation position is appropriately changed when another moving body should be stopped at the accommodation position where the moving boy is already stopped. As a result, it is possible to prevent the target accommodation position from being changed unnecessarily.

What is claimed is:

1. An accommodation area management device configured to manage an accommodation area for accommodating a moving body and stops the moving body at a predetermined accommodation position in the accommodation area, comprising:
   an acquisition unit configured to acquire position information of the moving body in the accommodation area;
   a determination unit configured to determine whether it is necessary to change a target accommodation position in which the moving body should be stopped to a second accommodation position different from a first accommodation position in the accommodation area when the moving body is stopped in the first accommodation position in the accommodation area based on the position information acquired by the acquisition unit; and
   a processing unit configured to perform a process of changing the target accommodation position subject to permission of a user of the moving body when the determination unit determines that it is necessary to change the target accommodation position,
   wherein the moving body transmits no-stop available information to the accommodation area management device when the moving body cannot stop at the second accommodation position after moving from the first accommodation position, and
   wherein the processing unit sets the target accommodation position to a third accommodation position located between a current position of the moving body and an exit of the accommodation area and different from the first accommodation position or the second accommodation position when the accommodation area management device receives the no-stop available information from the moving body.

2. The accommodation area management device according to claim 1, wherein
   the processing unit sets the target accommodation position which satisfies a designated condition specified by the user of the moving body when the target accommodation position of the moving body is changed.

3. The accommodation area management device according to claim 2, wherein
   the designated condition includes at least one of a moving distance of the moving body, the number of times the target accommodation position is changed, and the number of times of turning.

4. The accommodation area management device according to claim 2, wherein
   another user is proposed to change a target accommodation position when the target accommodation position which satisfies the designated condition does not exist.

5. The accommodation area management device according to claim 1, further comprising:
   a communication unit configured to be capable of communicating with a terminal device of the user of the moving body, wherein
   the communication unit sends a request to the terminal device to obtain permission for change of the target accommodation position when the determination unit determines that it is necessary to change the target accommodation position, and
   the processing unit changes the target accommodation position when the communication unit receives permission information for the request from the terminal device.

6. The accommodation area management device according to claim 1, wherein
   at least one of a discount on a usage fee of the accommodation area and a service that the moving body can receive in the accommodation area is offered to the user of the moving body who allows the change of the target accommodation position.

7. The accommodation area management device according to claim 1, wherein
   the determination unit further determines whether it is necessary to change the target accommodation position in which the moving body should be stopped based on whether another moving body which newly attempts to enter the accommodation area should be stopped at the first accommodation position.

* * * * *